(12) United States Patent
Barr et al.

(10) Patent No.: US 11,902,218 B2
(45) Date of Patent: *Feb. 13, 2024

(54) SIGNALING METHOD TO ENABLE FULL DUPLEX IN NEXT GENERATION DOCSIS CABLE MODEM STANDARD

(71) Applicant: Intel Corporation, Santa Clara, CA (US)

(72) Inventors: David Barr, San Jose, CA (US); Bernard Arambepola, Enfield (GB)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,123

(22) Filed: Jun. 22, 2022

(65) Prior Publication Data
US 2022/0321316 A1 Oct. 6, 2022

Related U.S. Application Data

(63) Continuation of application No. 16/866,580, filed on May 5, 2020, now Pat. No. 11,411,709, which is a
(Continued)

(51) Int. Cl.
*H04L 5/14* (2006.01)
*H04B 3/02* (2006.01)
(Continued)

(52) U.S. Cl.
CPC .............. *H04L 5/14* (2013.01); *H04B 3/02* (2013.01); *H04B 3/32* (2013.01); *H04L 12/2801* (2013.01);
(Continued)

(58) Field of Classification Search
CPC ... H04L 12/2898; H04L 5/14; H04L 12/2801; H04L 65/1101; H04B 3/02; H04B 3/32
See application file for complete search history.

(56) References Cited

U.S. PATENT DOCUMENTS

2012/0275792 A1\* 11/2012 Nandiraju ........... H04J 14/0298
398/66
2014/0022943 A1\* 1/2014 Ling .................... H04L 27/2601
370/254
(Continued)

*Primary Examiner* — Brian D Nguyen
(74) *Attorney, Agent, or Firm* — SPL Patent Attorneys PartG mbB; Yong Beom Hwang

(57) ABSTRACT

A head-end equipment associated with a communication system configured to interface with an interference group (IG) composed of two or more modems is disclosed. The head-end equipment comprises a memory configured to store a plurality of instructions; and one or more processors configured to retrieve the plurality of instructions from the memory. In some embodiments, the one or more processors, upon execution of the plurality of instructions from the memory, is configured to generate an advanced warning signal to be provided to one or more modems associated with the IG. In some embodiments, the advanced warning signal comprises an information that a select modem, different from the one or more modems, in the IG will be initiating an upstream communication in a select frequency band, as well as information on a start time and a duration of the upstream communication.

11 Claims, 8 Drawing Sheets

Related U.S. Application Data continuation of application No. 16/684,964, filed on Nov. 15, 2019, now abandoned, which is a continuation of application No. 15/908,360, filed on Feb. 28, 2018, now Pat. No. 10,855,433.

(60) Provisional application No. 62/479,426, filed on Mar. 31, 2017.

(51) Int. Cl.
*H04B 3/32* (2006.01)
*H04L 12/28* (2006.01)
*H04L 65/1101* (2022.01)

(52) U.S. Cl.
CPC ...... *H04L 12/2898* (2013.01); *H04L 65/1101* (2022.05)

(56) References Cited

U.S. PATENT DOCUMENTS

| | | | |
|---|---|---|---|
| 2017/0019239 A1* | 1/2017 | Jin | H04L 1/004 |
| 2017/0019241 A1* | 1/2017 | Jin | H04B 3/32 |
| 2017/0093555 A1* | 3/2017 | Hamzeh | H04L 5/0078 |

* cited by examiner

SIGNALING METHOD TO ENABLE FULL DUPLEX IN NEXT GENERATION DOCSIS CABLE MODEM STANDARD

REFERENCE TO RELATED APPLICATIONS

This application is a continuation of U.S. patent application Ser. No. 16/866,580 filed on May 5, 2020, which issued to U.S. Pat. No. 11,411,709 on Aug. 9, 2022, which is a continuation of U.S. patent application Ser. No. 16/684,964 filed on Nov. 15, 2019, which is a continuation of U.S. patent application Ser. No. 15/908,360 filed on Feb. 28, 2018, which issued as U.S. Pat. No. 10,855,433 on Dec. 1, 2020, which claims the benefit of provisional Application No. 62/479,426, filed Mar. 31, 2017, entitled "SIGNALING METHOD TO ENABLE FULL DUPLEX IN NEXT GENERATION DOCSIS CABLE MODEM STANDARD", the contents of which are herein incorporated by reference in their entirety.

FIELD

The present disclosure relates to the field of communication systems, and a system and method for signaling to enable full duplex in a cable modem communication network.

BACKGROUND

With the advancement of communication technology, more and more communication systems utilize full duplex (FDX). In FDX, both upstream and downstream communications share the same frequency band. In particular, the data over cable service interface specification (Docsis) cable modem standard for next generation hybrid fiber coax (HFC) technology will be based on full duplex (FDX). In FDX, a cable modem (CM) in a cable modem communication network can transmit upstream in the same frequency band as the head-end, for example, cable modem termination system (CMTS) or Remote-PHY node, transmits downstream. An upstream transmission burst from the CM will therefore interfere with downstream communication from the CMTS, temporarily "blinding" the reception of other neighboring CMs that are within an "Interference Group" (IG) (for example, on the same cable tap) as the CM transmitting upstream. As a result, the neighboring cable modems may go out of lock, and re-synchronization does take time. In some embodiments, blinding may cause degradation of the received signal quality, thereby degrading the reception of other neighboring CMs that are within the IG. Further, such blinding would negate much of the gains that could otherwise be made through the use of FDX.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1A:
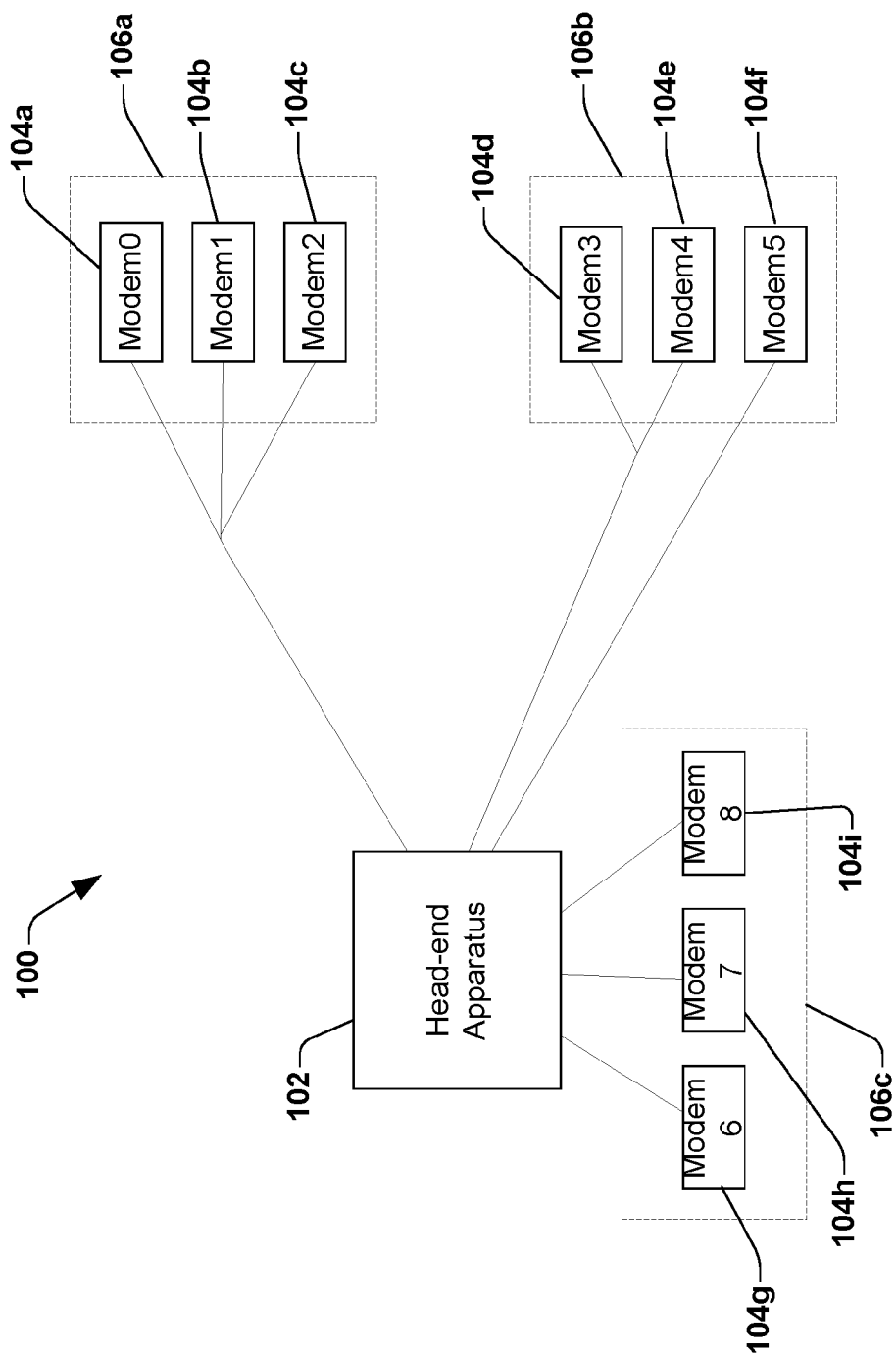
FIG. 1a illustrates a simplified block diagram of a communication system, according to one embodiment of the disclosure.

In one embodiment of the disclosure, a head-end equipment associated with a communication system configured to interface with an interference group (IG) composed of two or more modems is disclosed. The head-end equipment comprises a memory configured to store a plurality of instructions; and one or more processors. In some embodiments, the one or more processors is configured to retrieve the plurality of instructions from the memory, and upon execution of the plurality of instructions is configured to determine an upcoming upstream transmission from a select modem in the IG in a select frequency band. In some embodiments, the one or more processors is further configured to generate an advanced warning signal to be provided to one or more modems, different from the select modem, in the IG or suspend a downstream communication from the head-end equipment to the one or more modems of the IG in the select frequency band during a duration of the upstream communication, or both. In some embodiments, the advanced warning signal communicates an information that the select modem in the IG will be initiating the upstream communication in the select frequency band, as well as information on a start time and the duration of the upstream communication.

In one embodiment of the disclosure, a head-end equipment associated with a communication system configured to interface with an interference group (IG) composed of two or more modems is disclosed. The head-end equipment comprises a memory configured to store a plurality of instructions; and one or more processors. In some embodiments, the one or more processors is configured to retrieve the plurality of instructions from the memory, and upon execution of the plurality of instructions is configured to generate an advanced warning signal to be provided to one or more modems associated with the IG. In some embodiments, the advanced warning signal communicates an information that a select modem, different from the one or more modems, in the IG will be initiating an upstream communication in a select frequency band, as well as information on a start time and a duration of the upstream communication.

In one embodiment of the disclosure, a modem associated with a communication system configured to interface with a head-end equipment in a full duplex mode (FDX), wherein the modem is a member of an interference group (IG) of a plurality of modems is disclosed. The modem comprises a memory configured to store a plurality of instructions; and one or more processors. In some embodiments, the one or more processors is configured to retrieve the plurality of instructions from the memory, and upon execution of the plurality of instructions is configured to receive an advance warning signal from the head-end equipment. In some embodiments, the advance warning signal comprises information that another select modem of the IG will be initiating an upstream communication in a select frequency band, as well as information on a start time and a duration of the signaled upstream communication. In some embodiments, the one or more processors is further configured to take a protective action to protect the modem from a potential blinding event associated with the upstream communication in the select frequency band, in response to the advance warning signal, thereby enabling the modem to remain in a lock state with the head-end equipment, during the upstream communication in the select frequency band.

In one embodiment of the disclosure, a cable modem termination system (CMTS) configured to interface with an interference group (IG) composed of two or more cable modems (CMs) is disclosed. The CMTS comprises a memory configured to store a plurality of instructions; and one or more processors. In some embodiments, the one or more processors is configured to retrieve the plurality of instructions from the memory, and upon execution of the plurality of instructions is configured to generate an advanced warning signal to be provided to one or more cable modems (CMs) associated with the IG. In some embodiments, the advanced warning signal communicates an information that a select CM, different from the one or more CMs, in the IG will be initiating an upstream communication in a select frequency band, as well as information on a start time and a duration of the upstream communication.

In one embodiment of the disclosure, a cable modem (CM) configured to interface with a cable modem termination system (CMTS) in a full duplex mode (FDX) is disclosed. In some embodiments, the cable modem is a member of an interference group (IG) of a plurality of CMs. In some embodiments, the cable modem comprises a memory configured to store a plurality of instructions; and one or more processors. In some embodiments, the one or more processors is configured to retrieve the plurality of instructions from the memory, and upon execution of the plurality of instructions is configured to receive an advance warning signal from the CMTS. In some embodiments, the advance warning signal comprises information that another select CM of the IG will be initiating an upstream communication in a select frequency band, as well as information on a start time and a duration of the signaled upstream communication. In some embodiments, the one or more processors is further configured to take a protective action to protect the CM from a potential blinding event associated with the upstream communication in the select frequency band, in response to the advance warning signal. In some embodiments, taking the protective action enables the CM to remain in a lock state with the CMTS, during the upstream communication in the select frequency band.

In one embodiment of the disclosure, a method for cable modem termination system (CMTS) configured to interface with an interference group (IG) composed of two or more cable modems (CMs) is disclosed. The method comprises generating, at a processing circuit associated with the CMTS, an advanced warning signal to be provided to one or more cable modems (CMs) associated with the IG. In some embodiments, the advanced warning signal communicates an information that a select CM, different from the one or more CMs, in the IG will be initiating an upstream communication in a select frequency band, as well as information on a start time and a duration of the upstream communication.

In one embodiment of the disclosure, a method for a cable modem (CM) configured to interface with a cable modem termination system (CMTS) in a full duplex mode (FDX), wherein the cable modem is a member of an interference group (IG) of a plurality of CMs is disclosed. The method comprises receiving, at a processing circuit associated with the CM, an advance warning signal from the CMTS, wherein the advance warning signal comprises information that another select CM of the IG will be initiating an upstream communication in a select frequency band, as well as information on a start time and a duration of the signaled upstream communication. In some embodiments, the method further comprises taking a protective action to protect the CM from a potential blinding event associated with the upstream communication in the select frequency band, by the processing circuit, in response to the advance warning signal, thereby enabling the CM to remain in a lock state with the CMTS, during the upstream communication in the select frequency band.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit," "equipment" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from conte8, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from conte8 to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, the Docsis cable modem standard for next generation hybrid fiber coax (HFC) technology will be based on full duplex (FDX). In Docsis, downstream communication from the cable modem termination system (CMTS) to the cable modem (CM) is a continuous signal while the upstream communication from the CM to the CMTS occurs in bursts. The CM remains synchronized to the downstream communication all the time and derives the timing needed for upstream transmissions from the downstream signal. In current implementation of Docsis, the upstream and downstream communications are on different frequency bands (not full duplex), therefore the upstream communication does not interfere with the downstream communication. However, with the introduction of full duplex (FDX) in Docsis or any other standard that employs full duplex, this situation will change. In FDX, the upstream and downstream communications share the same frequency band, but the transmission mode remains the same as before, i.e., the downstream communication is continuous while the upstream communication or transmission occurs as bursts.

In a typical cable plant, multiple cable modems may be in close proximity with respect to one another. For example, in some embodiments, multiple cable modems may be connected to the same cable tap. Therefore, in such embodiments, an upstream transmission from a CM on that tap may appear as a severe noise burst to all other neighboring CMs on that tap, i.e., these neighboring CMs will be "blinded". In the embodiments described herein, all the CMs that are in close proximity with respect to one another are defined to be part of an Interference Group (IG). In other words, an IG is a group of CMs that interfere with each other, like a set of CMs on a single tap. In some embodiments, IG has a broader meaning and is not restricted to the interfering CMs that are on the same tap.

In some embodiments, the above-mentioned blinding of the neighboring CMs affect the efficient operation of the cable modem communication network. For example, if the interference power of the upstream communication is high and the duration long, the neighboring CMs may go out of lock. If the CMs go out of lock, the CMs will have to re-synchronize to the downstream signal and re-register with the CMTS and this is a time-consuming process. Further, if the CMs go out of lock, the CMs may take long to recover (due to the need to re-synchronize). In such embodiments, the CMTS cannot schedule transmissions to these neighboring CMs during this recovery period, and this represents loss of capacity because the CMTS cannot schedule a packet to the CM until it is sure that the CM has recovered. Further, in some embodiments, even if the CM recovers quickly, the CMTS has no option to know that the CM has recovered. Therefore, in such embodiments, the CMTS will be forced to provide a long period after the end of the upstream burst before it schedules anything to those CMs.

In order to overcome the above problems, an apparatus and a method that enables an efficient implementation of full duplex communication in a cable modem communication network is proposed in this disclosure. In particular, in one embodiment, a CMTS associated with the cable modem communication network that provides an advance warning to CMs of the same IG about an upcoming upstream communication burst is proposed. Further, in another embodiment, a cable modem associated with the cable modem communication network that takes a protective action upon receiving the advanced warning from the CMTS is proposed. In some embodiments, taking the protective action enables the CMs to remain synchronized or in lock with the CMTS during the upstream communication of a CM in the same IG, thereby reducing the adverse effects of the blinding issue indicated above. Although the proposed method is explained herein with reference to a cable based communication system (i.e., a cable modem communication network), the proposed apparatus and method is application to any communication system (i.e., wired or wireless) having a head-end equipment and one or more modems or transceivers associated therewith. In case of a wireless communication network, an IG may consist of a set of wireless transceivers in close proximity such that their transmissions interfere with one another.

FIG. 1*a* illustrates a simplified block diagram of a communication system 100, according to one embodiment of the disclosure. The communication system 100 comprises a head-end equipment 102 and a plurality of modems 104*a*-104*i* organized in a plurality of interference groups (IGs) 106*a*-106*c*. In some embodiments, the head-end equipment 102 comprises an equipment comprising a plurality of components located at a head-end location or a central location of a communication system and is configured to communicate with one or more modems or transceivers (e.g., the plurality of modems 104*a*-104*i*). However, in other embodiments, the head-end equipment 102 may be located a location different from the central location, for example, a communication node. In some embodiments, the modems 104*a*-104*i* comprises equipments (or communication devices) that are located at a location different from the central location and is configured to communicate with the head-end equipment. In the embodiments described herein, the modems 104*a*-104*i* refer to any transceiver or communication device that is configured to communicate with a head-end equipment and is not to be construed as limited to a cable modem. In some embodiments, the modems 104a-104i comprises equipments that are located in a user location.

In some embodiments, an IG may consist of a set of modems or transceivers (or communication devices) in close proximity such that their transmissions interfere with one another. As can be seen in FIG. 1a, an IG is not determined and identified by its architecture with respect to the head-end equipment 102, but instead by the interference environment associated with the various modems 104. That is, a particular modem 104a is determined to be in an IG with other modems 104b, 104c based on an impact an upstream communication of one modem of the group has on the receipt of a concurrent downstream communication from the head-end equipment 102 to the other modems. That is, in one example embodiment, an upstream communication by modem0 104a will cause a blinding event for modem1 104b and modem2 104c but not for the other modems 104d-104i, and thus modem0 104a, modem1 104b and modem2 104c are in an IG group 106a. In some embodiments, it is assumed that the head-end equipment 102 is aware of its IGs, prior to starting actual upstream/downstream communication. In some embodiments, one or more procedures are performed at the head-end equipment 102, prior to the upstream/downstream communication, in order to determine the IGs associated with the head-end equipment 102. However, those procedures are not explained herein as they are not considered to be within the scope of this disclosure.

In some embodiments, the communication system 100 can comprise wireless communication systems or wired communication systems. For example, in some embodiments, the communication system 100 can comprise a data over cable service interface specification (Docsis) cable modem system, digital subscriber line (DSL) system, Wi-Fi communication system, cellular communication system, fixed-wireless access communication system, optical communication system (e.g., passive optical network) etc. In particular, the Docsis cable modem system comprises a cable modem termination system (CMTS) as the head-end equipment 102 and a plurality of cable modems (CMs) as the plurality of modems 104a-104i. The DSL system comprises a digital subscriber line access multiplexer (DSLAM) as the head-end equipment 102 and a plurality of customer premises equipment (CPE) DSL modems as the plurality of modems 104a-104i. The Wi-Fi communication system comprises an access point (AP) as the head-end equipment 102 and client stations (e.g., cell phones, tablets, PCs, IoT devices etc.) as the plurality of modems 104a-104i. The cellular communication system comprises base stations as the head-end equipment 102 and the user equipments (e.g., cell phones, tablets, PCs, IoT devices etc.) as the plurality of modems 104a-104i. The passive optical network comprises optical line terminal (OLT) as the head-end equipment 102 and optical network units (ONUs) as the plurality of modems 104a-104i. Similarly, the fixed-wireless access communication system also comprises a head-end equipment and CPE modems at subscriber locations.

In some embodiments, the communication system 100 is configured to operate in full duplex (FDX). That is, in some embodiments, the downstream communication from the head-end equipment 102 and the upstream communication from the modems 104a-104i can share the same frequency band. In some embodiments, an upstream communication of a select modem (e.g., modem0 in the IG 106a) in an IG can interfere with the downstream communication of the head-end equipment 102 with one or more neighboring modems (e.g., modem1 and modem2 in the IG 106a) of the same IG, thereby blinding the one or more neighboring modems. In order to avoid the effects of blinding as indicated above, in some embodiments, the head-end equipment 102 is configured to provide an advance warning (e.g., an advance warning signal) to the one or more neighboring modems in an IG about the upcoming upstream communication from the select modem in a select frequency band/channel, further details of which are given in an embodiment below. In some embodiments, the advance warning signal comprises one or more advance warning signals that are respectively provided to the one or more neighboring modems. Alternately, in some embodiments, the head-end equipment 102 is configured to discontinue/suspend the downstream communication to the one or more neighboring modems (e.g., modem1 and modem2 in the IG 106a) in the select frequency band, during the upstream communication from the select modem, that is modem0, in order to avoid the effects of blinding. Furthermore, in some embodiments, head-end equipment 102 is configured to provide the advance warning (e.g., an advance warning signal) to the one or more neighboring modems in an IG about the upcoming upstream communication from the select modem in a select frequency band/channel as well as discontinue/suspend the downstream communication to the one or more neighboring modems (e.g., modem1 and modem2 in the IG 106a) in the select frequency band, during the upstream communication from the select modem.

Upon receiving the advance warning, in some embodiments, the one or more neighboring modems (e.g., modem1 and modem2 in the IG 106a) is configured to take a protective action, in order to prevent the adverse effects of blinding in the select frequency band. For example, in some embodiments, the one or more neighboring modems may be configured to save a current state of the respective modems, prior to the upstream communication from the select modem, further details of which are given in an embodiment below. In some embodiments, the one or more neighboring modems is further configured to suspend a receipt of the downstream communication from the head-end equipment 102 in the select frequency band, during a duration of the upstream communication of the select modem. In some embodiments, the one or more neighboring modems is further configured to resume the receipt of the downstream communication from the head-end equipment 102 in the select frequency band, at the end of the upstream communication of the select modem. In some embodiments, saving the current state enables the one or more neighboring modems to recover quickly and resume the receipt of the downstream communication from the head-end equipment 102 in the select frequency band at the end of the upstream communication of the select modem.

Figure 1B:
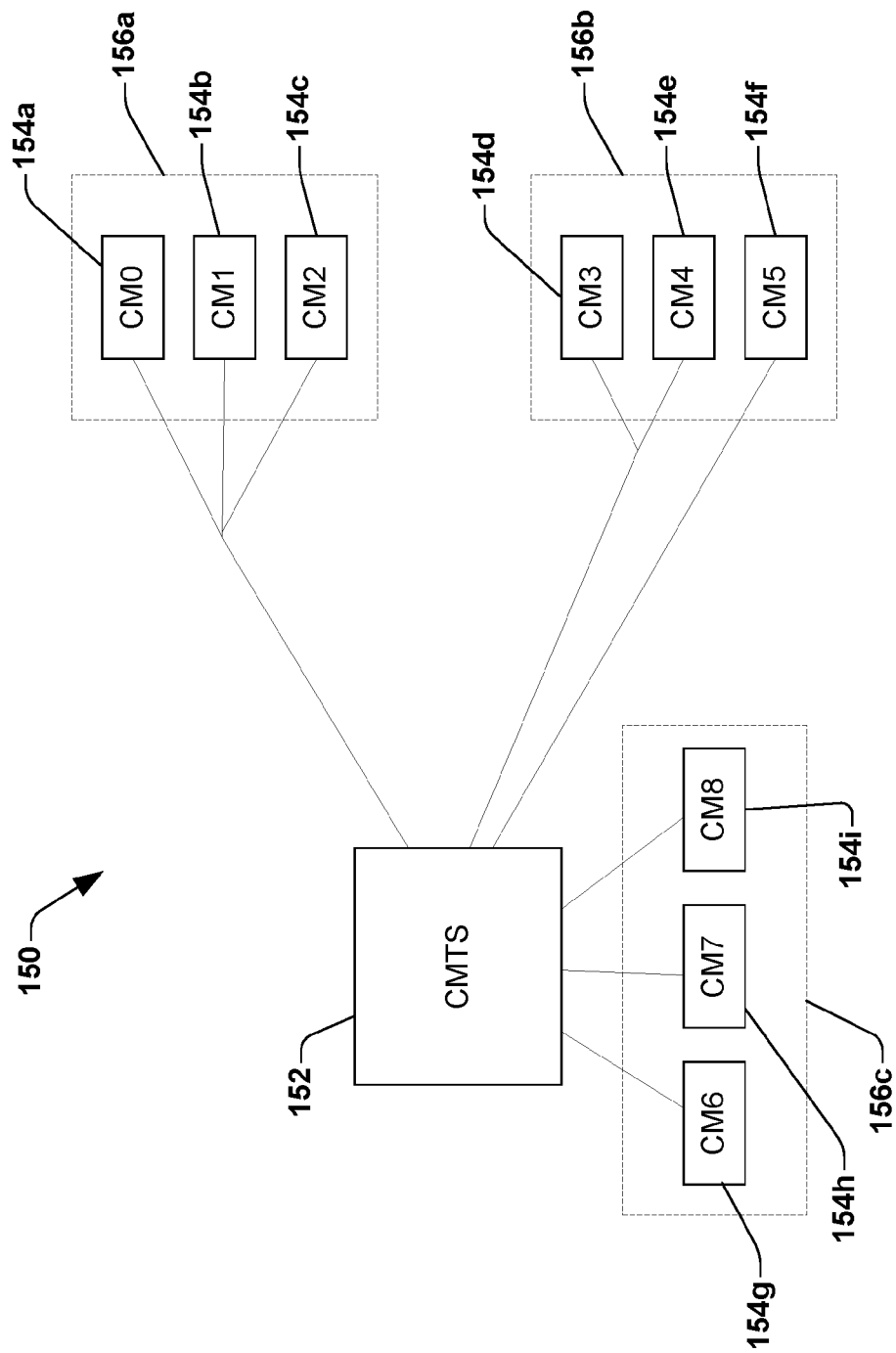
FIG. 1b illustrates an exemplary block diagram of a cable modem communication network, according to one embodiment of the disclosure.

FIG. 1b illustrates a simplified block diagram of a cable modem communication network 150, according to one embodiment of the disclosure. In some embodiments, the cable modem communication network 150 comprises an example implementation of the communication system 100 in FIG. 1a. Even though, all the embodiments that follows are described with reference to a cable modem communication network, the communication system 100 in FIG. 1a is not to be construed to be limited to a cable modem communication network. Rather, the communication system 100 can comprise other cable based or wireless communication system, in other embodiments. In some embodiments, the cable modem communication network 150 comprises a Docsis compliant cable modem communication network. The cable modem communication network 150 includes a cable modem termination system (CMTS) 152 and a plurality of cable modems (CMs) 154a-154i organized in a plurality of interference groups 156a-156c. In some embodiments, the CMTS 152 comprises an equipment comprising a plurality of components located at a head-end location or a central location of a cable modem communication network. In some embodiments, the CMTS 152 may include a CMTS core and a remote PHY device, coupled to one another. In some embodiments, the CMTS core and the remote PHY device are coupled to one another over a digital fiber or other link such as Ethernet or passive optical network (PON). In some embodiments, the CMTS core and the remote PHY device work together to provide downstream communication to the one or more CMs 154a-154i. In some embodiments, the CMTS core and the remote PHY device can be integrated on a single platform at the same location (e.g., at the head-end), sometimes referred to herein as an integrated CMTS. However, in other embodiments, the CMTS core and the remote PHY device can be on different platforms and at different locations (e.g., the CMTS core at the head-end and the remote PHY device further downstream of the CMTS core). Therefore, in the embodiments described throughout this disclosure, the term CMTS is defined to refer to a system comprising both the CMTS core and the remote PHY device (either integrated together or separated). In particular, in the embodiments described throughout the disclosure, a downstream communication from a CMTS (e.g., the CMTS 152) can refer to a downstream communication from an integrated CMTS at the head-end or a remote PHY device or a CMTS core. Similarly, in the embodiments described throughout the disclosure, an upstream communication from a CM can be received at the integrated CMTS or the remote PHY.

As can be seen in FIG. 1b, an IG is not determined and identified by its architecture with respect to the CMTS 152, but instead by the interference environment associated with the various cable modems 154. That is, a particular cable modem 154a is determined to be in an IG with other CMs 154b, 154c based on an impact an upstream communication of one CM of the group has on the receipt of a concurrent downstream communication from the CMTS. That is, in one example embodiment, an upstream communication by CM0 154a will cause a blinding event for CM1 and CM2 but not for the other CMs 154d-154i, and thus CM0 154a, CM1 154b and CM2 154c are in an IG group 156a. In some embodiments, it is assumed that the CMTS 152 is aware of its IGs, prior to starting actual upstream/downstream communication. In some embodiments, one or more procedures are performed at the CMTS 152, prior to the upstream/downstream communication, in order to determine the IGs associated with the CMTS 152. However, those procedures are not explained herein as they are not considered to be within the scope of this disclosure.

In some embodiments, the cable modem communication network 150 is configured to operate in full duplex (FDX). That is, in some embodiments, the downstream communication from the CMTS 152 and the upstream communication from the CMs can share the same frequency band. In some embodiments, an upstream communication of a select CM (e.g., CM0 in the IG 156a) in an IG can interfere with the downstream communication of the CMTS with one or more neighboring CMs (e.g., CM1 and CM2 in the IG 156a) of the same IG, thereby blinding the one or more neighboring CMs. In order to avoid the effects of blinding as indicated above, in some embodiments, the CMTS 152 is configured to provide an advance warning (e.g., an advance warning signal) to the one or more neighboring CMs in an IG about the upcoming upstream communication from the select CM in a select frequency band/channel, further details of which are given in an embodiment below. In some embodiments, the advance warning signal comprises one or more advance warning signals that are respectively provided to the one or more neighboring CMs. Alternately, in some embodiments, the CMTS 152 is configured to discontinue/suspend the downstream communication to the one or more neighboring CMs (e.g., CM1 and CM2 in the IG 156a) in the select frequency band, during the upstream communication from the select CM, that is CM0, in order to avoid the effects of blinding. Alternately, in some embodiments, the CMTS 152 is configured to provide the advance warning (e.g., an advance warning signal) to the one or more neighboring CMs in the IG about the upcoming upstream communication from the select CM in the select frequency band/channel as well as discontinue/suspend the downstream communication to the one or more neighboring CMs (e.g., CM1 and CM2 in the IG 156a) in the select frequency band, during the upstream communication from the select modem.

Upon receiving the advance warning, in some embodiments, the one or more neighboring CMs (e.g., CM1 and CM2 in the IG 156a) is configured to take a protective action, in order to prevent the adverse effects of blinding in the select frequency band. For example, in some embodiments, the one or more neighboring CMs may be configured to save a current state of the respective CMs, prior to the upstream communication from the select CM, further details of which are given in an embodiment below. In some embodiments, the one or more neighboring CMs are further configured to suspend a receipt of the downstream communication from the CMTS 152 in the select frequency band, during a duration of the upstream communication of the select CM, based on the information in the advance warning signal. In some embodiments, the one or more CMs is further configured to resume the receipt of the downstream communication from the CMTS 152 in the select frequency band, at the end of the upstream communication of the select CM, based on the information in the advance warning signal. In some embodiments, saving the current state enables the one or more neighboring CMs to recover quickly and resume the receipt of the downstream communication from the CMTS 152 in the select frequency band at the end of the upstream communication of the select CM.

Figure 2:
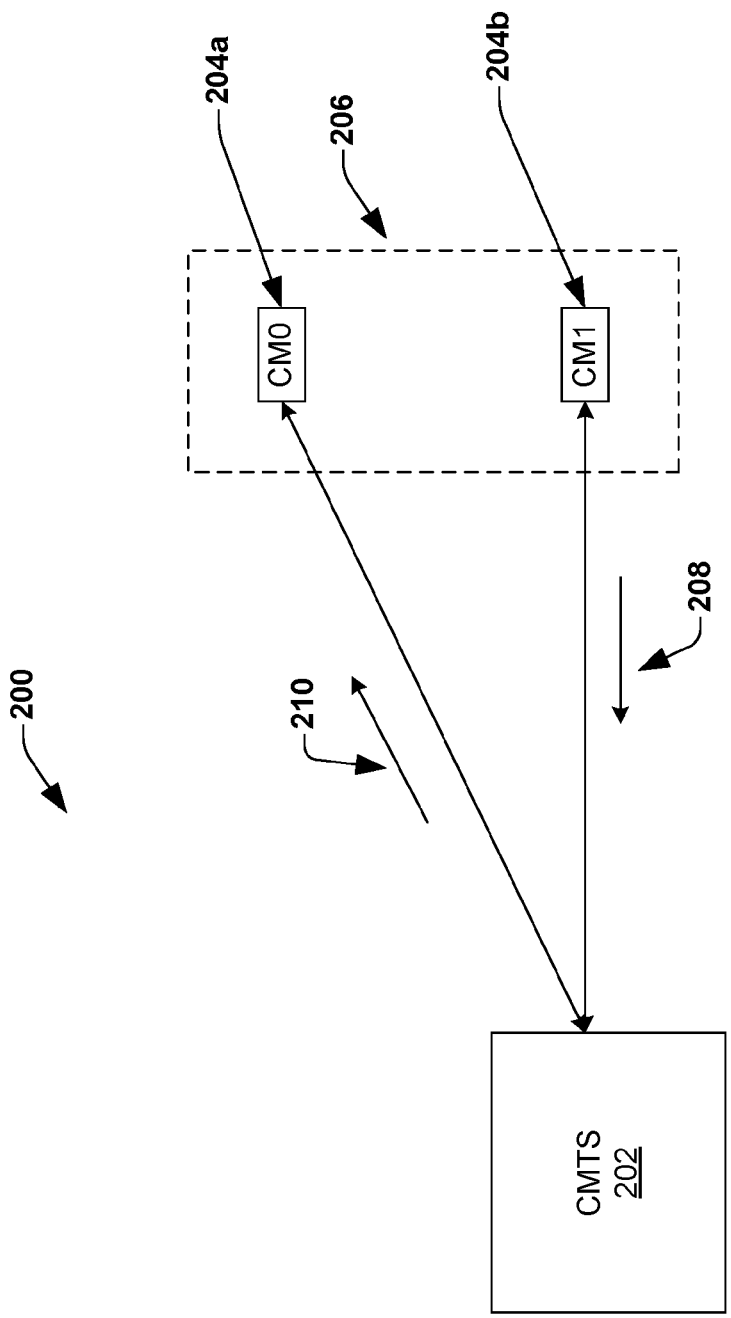
FIG. 2 illustrates a simplified block diagram of a cable modem communication network, according to one embodiment of the disclosure.

FIG. 2 illustrates a simplified block diagram of a cable modem communication network 200, according to one embodiment of the disclosure. In some embodiments, the cable modem communication network 200 comprises a Docsis compliant cable modem communication network. In some embodiments, the cable modem communication network 200 comprises a part of the compliant cable modem communication network 150 in FIG. 1b. The cable modem communication network 200 comprises a cable modem termination system (CMTS) 202, a first cable modem CM0 204a and a second cable modem CM1 204b. In some embodiments, the cable modems CM0 204a and CM1 204b belong to a same interference group (IG) 206. In this embodiment, the cable modem communication network 200 is shown to have only 2 cable modems for the ease of reference. However, in other embodiments, the cable modem communication network 200 can comprise any number of cable modems grouped into one or more IGs.

Further, in this embodiment, the cable modem communication network 200 is shown to comprise only one IG, that is, the IG 206. However, in other embodiments, the cable modem communication network 200 may comprise a plurality of IGs, each comprising two or more CMs that interfere severely with one another, as shown in FIG. 1b above. Furthermore, even though the following details are given with reference to the cable modem communication network 200, the details or the method are applicable to any communication system (e.g., the communication system 100 in FIG. 1a). In particular, the details/method explained herein with reference to the CMTS 202 is applicable to any head-end equipment (e.g., head-end equipment 102) configured to communicate with at least two modems or devices in an IG in any communication system. Similarly, the details/method explained herein with reference to the CM0 204a and CM1 204b is applicable to any modem (e.g., the modems 104a-104i) in an IG configured to communicate with a head-end equipment in any communication system.

In some embodiments, the CMTS 202 is configured to determine information on an upcoming upstream communication from CM0 204a or CM1 204b, or both. In this example embodiment, for the sake of easier explanation, the CMTS 202 is shown to determine an upcoming upstream communication from CM1 204b. In some embodiments, the information on the upcoming upstream communication comprises information on a start time, duration, frequency band etc. of the upcoming upstream communication. In some embodiments, an upstream communication from the CM1 204b in a select frequency band may interfere with a downstream communication between the CMTS 202 and the neighboring cable modem, CM0 204a, on the select frequency band. In some embodiments, the CM0 204a will be blinded as indicated above, and will not be able to receive the downstream communication from the CMTS 202 in the select frequency band, during the upstream communication of the cable modem CM1 204b in the select frequency band. However, the CM0 204a may be able to receive downstream communication in another frequency band, different from the select frequency band, during the upstream communication of the cable modem CM1 204b in the select frequency band.

In some embodiments, the CMTS 202 is configured to determine information on an upcoming upstream communication from the CM1 204b based on receiving an upstream communication request signal 208 from the CM1 204b. For example, in some embodiments, when one of the CMs, for example, CM1 204b has an upstream data to be transmitted to the CMTS 202, the CM1 204b is configured to transmit the upstream communication request signal 208 to the CMTS 202. In some embodiments, the upstream communication request signal 208 comprises a request to allocate resources to the CM1 204b, to enable the CM1 204b to transmit the upstream data. In some embodiments, upstream communication request signal 208 further comprises information on one or more parameters associated with the upstream data, for example, length as number of bits etc. However, in other embodiments, the CMTS 202 may determine the information on an upcoming upstream communication from the CM1 204b, differently. Upon receiving the upstream communication request signal 208, the CMTS 202 is configured to allocate/schedule resources to the CM1 204b for upstream communication, based on the information in the upstream communication request signal 208. For example, in some embodiments, the CMTS 202 schedules the CM1 204b to transmit upstream communication in a select frequency band.

Upon determination of the upcoming upstream communication from CM1 204b in a select frequency band, in order to prevent the effect of blinding for the cable modem CM0 204a in the select frequency band, in some embodiments, the CMTS 202 is configured to generate and provide an advance warning signal 210 to the CM0 204a (i.e., the neighboring CM), prior to the upstream communication from the cable modem CM1 204b. In this embodiment, the CMTS 202 is shown to provide the advance warning signal 210 only to the CM, CM0 204a. However, in other embodiments, the CMTS 202 may be configured to provide the advance warning signal 210 to one or more neighboring CMs (not shown) in the same IG as the CM, CM1 204b. In some embodiments, the advance warning signal 210 comprises an information that a select CM (for example, the CM1 204b) in the IG 206 will be initiating an upstream communication in the select frequency band. In some embodiments, the advance warning signal 210 further comprises information on a start time and a duration of the upstream communication. In some embodiments, when there are one or more neighboring CMs in an IG, the advance warning signals 210 can comprise one or more advance warning signals to be provided respectively to the one or more neighboring CMs.

In some embodiments, the CMTS 202 may be configured to generate the advance warning signal 210 based on inserting the information associated with the advance warning signal 210 into physical layer OFDM symbol headers. Further, in some embodiments, the CMTS 202 may be configured to provide the advance warning signal 210 to the CM0 204a over a Physical Layer Channel (PLC). Alternately, in some embodiments, the CMTS 202 may be configured to provide the advance warning signal 210 to the CM0 204a via media access control (MAC) messaging, for example in a media access plan (MAP) message. However, in other embodiments, the CMTS 202 may be configured to generate and provide the advance warning signal 210 differently than above.

Alternately, in some embodiments, upon determination of the upcoming upstream communication in the select frequency band, the CMTS 202 is configured to suspend a downstream communication from the CMTS 202 to the CM0 204a in the select frequency band, during the duration of the signaled upstream communication from the CM1 204b, in order to prevent the effect of blinding for the cable modem CM0 204a in the select frequency band. In some embodiments, however, the CMTS 202 may be configured to schedule the downstream communication to the CM0 204a of the IG, in a frequency band, different from the select frequency band, during the duration of the signaled upstream communication. In some embodiments, the CMTS 202 is further configured to resume the downstream communication to the CM0 204a in the select frequency band, after the signaled upstream communication has completed, based on the start time and the duration. Alternately, in some embodiments, upon determination of the upcoming upstream communication in the select frequency band, the CMTS 202 is configured to generate and provide an advance warning signal 210 to the CM0 204a (i.e., the neighboring CM), prior to the upstream communication from the cable modem CM1 204b as well as suspend a downstream communication from the CMTS 202 to the CM0 204a in the select frequency band, during the duration of the signaled upstream communication from the CM1 204b, in order to prevent the effect of blinding for the cable modem CM0 204a in the select frequency band.

Upon receiving the advance warning signal 210, in some embodiments, the CM0 204a is configured to take a protective action to protect the CM0 204a from the potential blinding event associated with the upstream communication of the CM1 204b in the select frequency band. In some embodiments, the CM0 204a is configured to take a protective action based on the start time and the duration of the upstream communication, provided in the advance warning signal 210. In some embodiments, it is contemplated that the protective action enables the CM0 204a to be effectively in a "frozen" or "locked" state during the time frame of the upstream communication, in which state the CM0 204a does not lose its lock with the CMTS 202. In such a manner, the CM 204a stays in lock with the CMTS 202 despite the existence of the blinding event, which allows the CM0 204a to quickly re-start/recover at the end of the potential blinding event, without a need to re-synchronize with the CMTS 202.

In some embodiments, the CM0 204a is configured to take the protective action based on saving one or more parameters associated with a current state of the CM0 204a (e.g., a state of the CM0 204a at or just before the start time of the upstream communication), in a memory associated with the CM0 204a. However, in other embodiments, the CM0 204a may be configured to take the protective action differently than above. In some embodiments, the current state of the CM, for example, the CM0 204a, is characterized by one or more of a signal level, a signal timing, a frequency offset, and a channel frequency response. However, in other embodiments, the current state of a CM can be characterized differently, for example, using other parameters different from above. In some embodiments, the CM0 204a is further configured to suspend a receipt of a downstream communication from the CMTS 202 in the select frequency band, during the duration of the signaled upstream communication, thereby further enabling the CM0 204a to remain in the lock state.

In some embodiments, the CM0 204a is further configured to restore its current state, at the end of the potential blinding event. In some embodiments, the CM0 204a includes a timer (not shown) that begins counting based on a start time of the upstream communication provided in the advance warning signal 210. When the timer reaches a predetermined count value based on the duration of the upstream communication provided in the advance warning signal 210, the CM0 204a is configured to restore the current state that was stored in memory. Upon restoring the current state, in some embodiments, the CM0 204a is further configured to resume the receipt of downstream communications from the CMTS 202.

Figure 3:
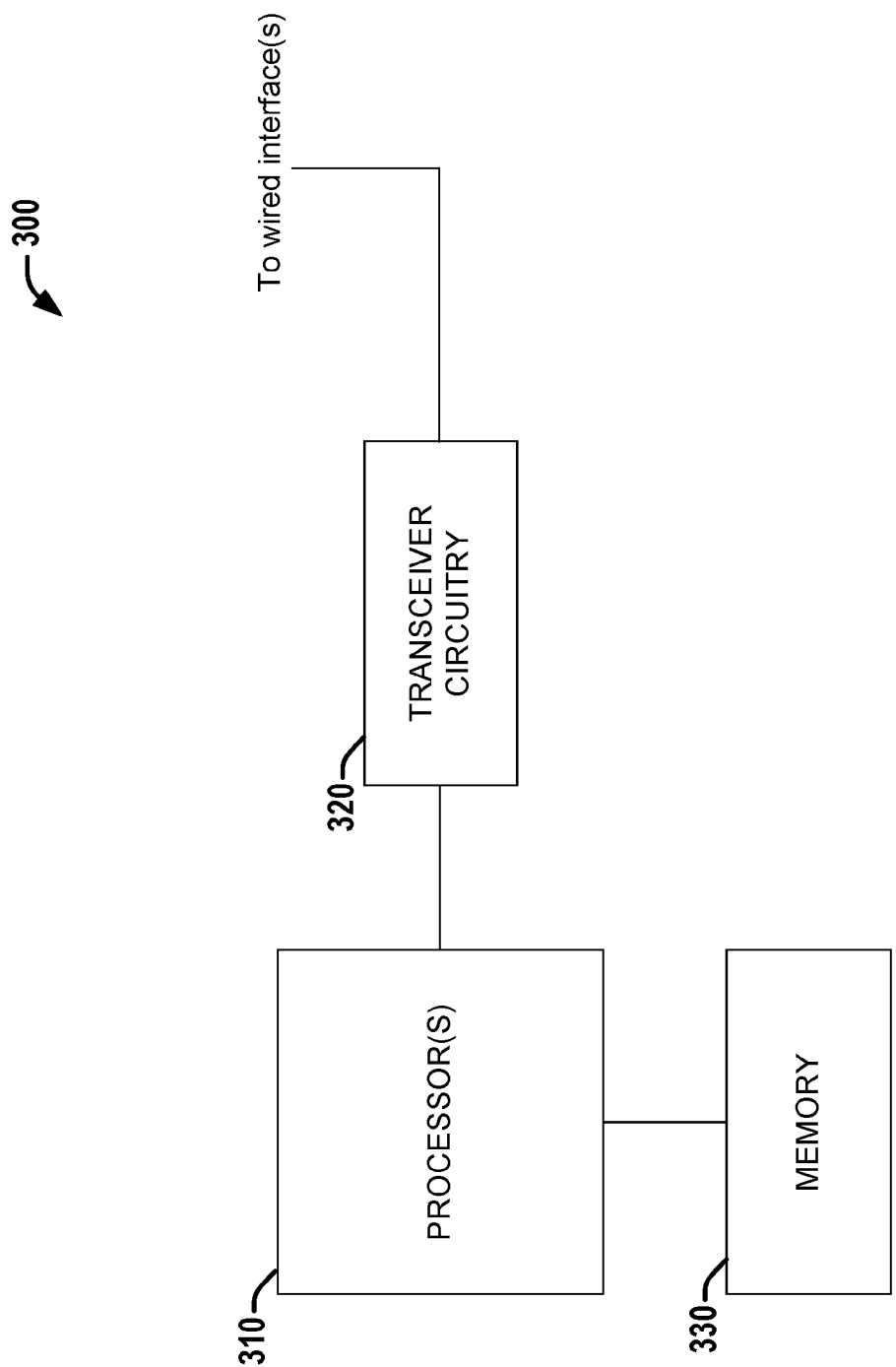
FIG. 3 illustrates a simplified block diagram of an apparatus for use in a head-end equipment that facilitates to provide an advance warning signal to a modem associated therewith during a full-duplex mode, according to various embodiments described herein.

FIG. 3 illustrates a simplified block diagram of an apparatus 300 for use in a head-end equipment that facilitates to provide an advance warning signal to a modem associated therewith during a full-duplex mode, according to various embodiments described herein. In some embodiments, the head-end equipment comprises a cable modem termination system (CMTS) and the modem comprises a cable modem. In some embodiments, the apparatus 300 could be included within the head-end equipment 102 in FIG. 1a or the CMTS 152 in FIG. 1b or within the CMTS 202 in FIG. 2. The apparatus 300 is explained herein with reference to the CMTS 202 in FIG. 2. However, in other embodiments, the apparatus can be explained with reference to any head-end equipment (e.g., the head-end equipment 102 in FIG. 1a). The apparatus 300 includes a processing circuit 310, a transceiver circuit 320 (which can facilitate communication of data via one or more networks in some aspects) and a memory circuit 330 (which can comprise any of a variety of storage mediums and can store instructions and/or data associated with at least one of the processor 310 or transceiver circuitry 320). In some embodiments, the transceiver circuit 320 may include, inter alia, down-mixers, filters, and A/D converters to convert the high frequency upstream communication to digital data, such as baseband data for example. Further, in some embodiments, the transceiver circuit 320 may include, inter alia, up-mixers, filters, and D/A converters to convert digital data, such as baseband data for example, to high frequency downstream communication. In some embodiments, the transceiver circuit 320 can include one or more transceiver circuits, for example, a first transceiver circuit associated with the CMTS core of the CMTS and a second transceiver circuit associated with the remote PHY device of the CMTS.

In one embodiment, the transceiver circuitry 320 passes the digital data to the processing circuit 310. In some embodiments, the transceiver circuit 320 can comprise a receiver circuit and a transmitter circuit. In some embodiments, the processing circuit 310 can include one or more processors. In some embodiments, the one or more processors can be integrated on a single chip or at a same location (e.g., the integrated CMTS at the head-end). However, in other embodiments, the one or more processors can be embedded on different chips or at different locations (e.g., associated with the CMTS core of the CMTS and the remote PHY device of the CMTS). In some embodiments, the memory circuit 330 comprises a computer readable storage device that includes instructions to be executed by the processor 310. In some embodiments, the memory circuit 330 can be an independent circuit and in other embodiments, the memory circuit 330 can be integrated on chip with the processor 310. Alternately, in other embodiments, the instructions to be executed by the processor 310 can be stored on a non-transitory storage medium like ROM, flash drive etc., and can be downloaded to the memory circuit 330 for execution. In some embodiments, the memory circuit 330 can comprise one or more memory circuits. In some embodiments, the one or more memory circuits can be integrated on a single chip or at a same location (e.g., the integrated CMTS at the head-end). However, in other embodiments, the one or more memory circuits can be embedded on different chips (e.g., associated with the CMTS core of the CMTS and the remote PHY device of the CMTS). As described in greater detail below, apparatus 300 can facilitate to signal a potential blinding event to a CM, during a full duplex mode.

In some embodiments, the processing circuit is configured to determine information on an upcoming upstream communication from a select CM (e.g., the CM1 204b in FIG. 2). In some embodiments, the processing circuit is configured to determine information on an upcoming upstream communication from the select CM based on receiving an upstream communication request signal (e.g., the upstream communication request signal 208 in FIG. 2) from the select CM. For example, in some embodiments, when the select CM (e.g., the CM1 204b in FIG. 2) associated with an IG (e.g., the IG 206) has upstream data to be transmitted to a CMTS (e.g., the CMTS 202 in FIG. 2), the select CM transmits an upstream communication request signal (e.g., the upstream communication request signal 208 in FIG. 2) to the CMTS. In some embodiments, the upstream communication request signal comprises a request to allocate resources to the select CM, to enable the select CM to transmit the upstream data. In some embodiments, upstream communication request signal further comprises information on one or more parameters associated with the upstream data, for example, length as number of bits etc. In such embodiments, the processing circuit 310 is configured to receive the upstream communication request signal, via the transceiver circuit 320 and determine information on the upcoming upstream communication from the select CM based on allocating/scheduling resources to the select CM for upstream communication. In some embodiments, the processing circuit 310 is configured to allocate/schedule resources to the select CM for upstream communication based on the information in the upstream communication request signal, in accordance with the instructions stored in the memory circuit 330. In some embodiments, the processing circuit 310 allocates a select frequency band to the select CM for the upstream communication. However, in other embodiments, the processing circuit 310 may be configured to determine information on the upcoming upstream communication from the select CM, differently.

In some embodiments, once the information on the upcoming upstream communication (e.g., start time, duration, frequency band etc.) is determined for the select CM, the processing circuit 310 is further configured to generate an advance warning signal (e.g., the advance warning signal 210 in FIG. 2) to be provided to one or more neighboring CMs (e.g., the CM0 204a in FIG. 2) in the IG, in order to warn the neighboring CMs about a potential blinding event, due to the upstream communication from the select CM. In some embodiments, the usage "one or more neighboring CMs" refer to CMs within the same IG that are different from the select CM.

Alternately, in other embodiments, once the information on the upcoming upstream communication (e.g., start time, duration, frequency band etc.) is determined for the select CM, the processing circuit 310 is configured to suspend a downstream communication from the CMTS to the one or more neighboring CMs in the select frequency band, during the duration of the signaled upstream communication, in order to prevent the effects of blinding. However, in some embodiments, the processing circuit 310 may be configured to schedule the downstream communication to the one or more neighboring CMs, in a frequency band, different from the select frequency band, during the duration of the signaled upstream communication. Further, in some embodiments, the processing circuit 310 is configured to resume the downstream communication to the one or more neighboring CMs in the select frequency band, after the signaled upstream communication has completed, based on the start time and the duration. Alternately, in some embodiments, once the information on the upcoming upstream communication (e.g., start time, duration, frequency band etc.) is determined for the select CM, the processing circuit 310 is configured to generate an advance warning signal (e.g., the advance warning signal 210 in FIG. 2) to be provided to one or more neighboring CMs (e.g., the CM0 204a in FIG. 2) in the IG as well as suspend a downstream communication from the CMTS to the one or more neighboring CMs in the select frequency band, during the duration of the signaled upstream communication, in order to prevent the effects of blinding.

In some embodiments, the advance warning signal comprises an information that a select CM (e.g., the CM1 204b) in the IG (e.g., the IG 206 in FIG. 2) will be initiating an upstream communication in a select frequency band. In some embodiments, the advance warning signal further comprises information on the start time and the duration of the upstream communication. In some embodiments, the processing circuit 310 is further configured to provide the advance warning signal to the one or more neighboring CMs, via the transceiver circuit 320. In some embodiments, the processing circuit 310 is configured to provide the advance warning signal to the one or more neighboring CMs, prior to the start time of the upstream communication from the select CM. In some embodiments, the processing circuit 310 is configured to generate the advance warning signal based on inserting the information associated with the advance warning signal into physical layer OFDM symbol headers. In some embodiments, the processing circuit 310 is configured to provide the advance warning signal to the one or more neighboring CMs, over a Physical Layer channel (PLC). Alternately, in some embodiments, the processing circuit 310 is configured to provide the advance warning signal to the one or more neighboring CMs, via media access control (MAC) messaging. Further, in some embodiments, the processing circuit 310 may be configured to generate and provide the advance warning signal 210 differently than above.

Figure 4:
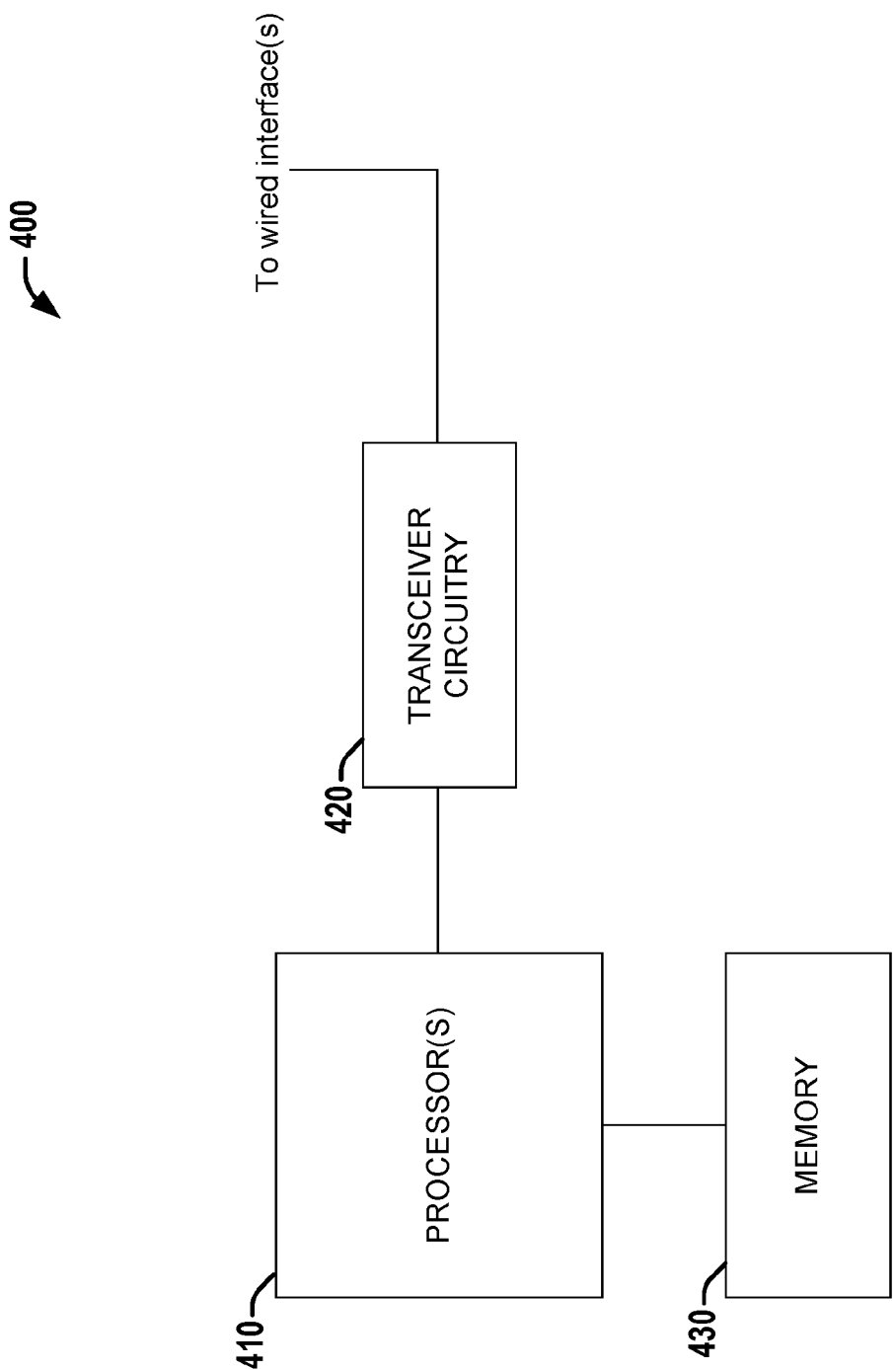
FIG. 4 illustrates a simplified block diagram of an apparatus for use in a modem that facilitates to take a protective action during a potential blinding event, according to various embodiments described herein.

FIG. 4 illustrates a simplified block diagram of an apparatus 400 for use in a modem that facilitates to take a protective action during a potential blinding event, according to various embodiments described herein. In some embodiments, the modem comprises a cable modem (CM) associated with a cable modem communication network (e.g., the cable modem communication network 150 in FIG. 1b). In some embodiments, the apparatus 400 could be included within the cable modem CM0 204a in FIG. 2 and therefore, apparatus 400 is explained herein with reference to the cable modem CM0 204a in FIG. 2. However, in other embodiments, the apparatus 400 could be included within any other modems, for example, the modems depicted in FIG. 1a or the cable modems depicted in FIG. 1b and FIG. 2. The apparatus 400 includes a processing circuit 410, a transceiver circuit 420 (which can facilitate communication of data via one or more networks in some aspects) and a memory circuit 430 (which can comprise any of a variety of storage mediums and can store instructions and/or data associated with at least one of the processor 410 or transceiver circuitry 420). In some embodiments, the transceiver circuit 420 may include, inter alia, down-mixers, filters, and A/D converters to convert the high frequency downstream communication to digital data, such as baseband data for example.

In one embodiment, the transceiver circuitry 420 passes the digital data to the processing circuit 410. In some embodiments, the transceiver circuit 420 can comprise a receiver circuit and a transmitter circuit. In some embodiments, the processing circuit 410 can include one or more processors. In some embodiments, the memory circuit 430 comprises a computer readable storage device that includes instructions to be executed by the processor 410. In some embodiments, the memory circuit 430 can be an independent circuit and in other embodiments, the memory circuit 430 can be integrated on chip with the processor 410. Alternately, in other embodiments, the instructions to be executed by the processor 410 can be stored on a non-transitory storage medium like ROM, flash drive etc., and can be downloaded to the memory circuit 430 for execution. As described in greater detail below, apparatus 400 can facilitate to take protective action at the CM during a potential blinding event associated with a full-duplex mode of operation.

In some embodiments, the processing circuit 410 is configured to receive an advance warning signal (e.g., the advance warning signal 210 in FIG. 2) from a CMTS (e.g., the CMTS 202 in FIG. 2), via the transceiver circuitry 420. In some embodiments, the advance warning signal comprises an information that a select CM (e.g., the CM1 204b in FIG. 2) in the IG (e.g., the IG 206 in FIG. 2) will be initiating an upstream communication in a select frequency band. In some embodiments, the advance warning signal further comprises information on the start time and the duration of the upstream communication. Upon receiving the advance warning signal, the processing circuit 410 is configured to take a protective action, in order to protect the CM from a potential blinding event associated with the upstream communication of the select CM. In some embodiments, the processing circuit 410 is configured to take the protective action, based on instructions stored in the memory circuit 430. In some embodiments, the processing circuit 410 is configured to take the protective action prior to the start time of the upstream communication of the select CM.

In some embodiments, the processing circuit 410 is configured to take the protective action by saving a current state of the processing circuit 410, or the transceiver circuit 420, or both, in the memory circuit 430, prior to the start time of the upstream communication of the select CM. In some embodiments, the current state of the processing circuit 410, or the transceiver circuit 420 is characterized by one or more of a signal level, a signal timing, a frequency offset, and a channel frequency response. Therefore, in such embodiments, the processing circuit 410 is configured to save information on one or more of the signal level, the signal timing, the frequency offset, and the channel frequency response, prior to the start time of the upstream communication of the select CM. However, in other embodiments, the current state of the processing circuit 410, or the transceiver circuit 420 can be characterized differently, based on parameters different than above.

In some embodiments, the processing circuit 410 is further configured to signal the transceiver circuit 420 to suspend a receipt of a downstream communication from the CMTS in the select frequency band, during the duration of the signaled upstream communication. In some embodiments, the processing circuit 410 is configured to generate and provide one or more control signals (not shown) to the transceiver circuit 420, in order to signal the transceiver circuit 420 to suspend a receipt of a downstream communication from the CMTS, thereby enabling the processing circuit 410 to take the protective action. In some embodiments, the processing circuit 410 is further configured to provide the one or more control signals to the transceiver circuit 420, in order to receive information on the current state of the transceiver circuit 420, thereby enabling the processing circuit 410 to take the protective action.

In some embodiments, taking the protective action at the processing circuit 410 enables the CM (i.e., the CM0 204a) to remain in a locked state or a frozen state with the CMTS, during the duration of upstream communication from the select CM. In some embodiments, staying in the lock state or the frozen state allows the CM to quickly re-start/recover at the end of the potential blinding event, without a need to re-synchronize with the CMTS. In some embodiments, the processing circuit 410 is further configured to restore the current state of the processing circuit 410, or the transceiver circuit 420, or both, at a time associated with an end of the potential blinding event or the upstream communication from the select CM. In some embodiments, the time associated with an end of the potential blinding event is defined by the specified start time and the specified duration in the advance warning signal.

In some embodiments, the processing circuit 410 is further configured to signal the transceiver circuit 420 to resume the receipt of the downstream communication from the CMTS in the select frequency band, upon the restoring of the current state of the processing circuit 410 or the transceiver circuit 420 or both. In some embodiments, the processing circuit 410 is configured to generate and provide one or more restoration signals (not shown) to the transceiver circuit 420, in order to signal the transceiver circuit 420 to restore the current state of the processing circuit 410, or the transceiver circuit 420, or both. In some embodiments, the processing circuit 410 is further configured to provide the one or more restoration signals to the transceiver circuit 420, in order to signal the transceiver circuitry 420 to resume the receipt of the downstream communication from the CMTS in the select frequency band. In some embodiments, the processing circuit 410 is further configured to start a timer at the specified start time of the signaled upstream communication and configured to count to a count value associated with the specified duration of the signaled upstream communication.

Figure 5:
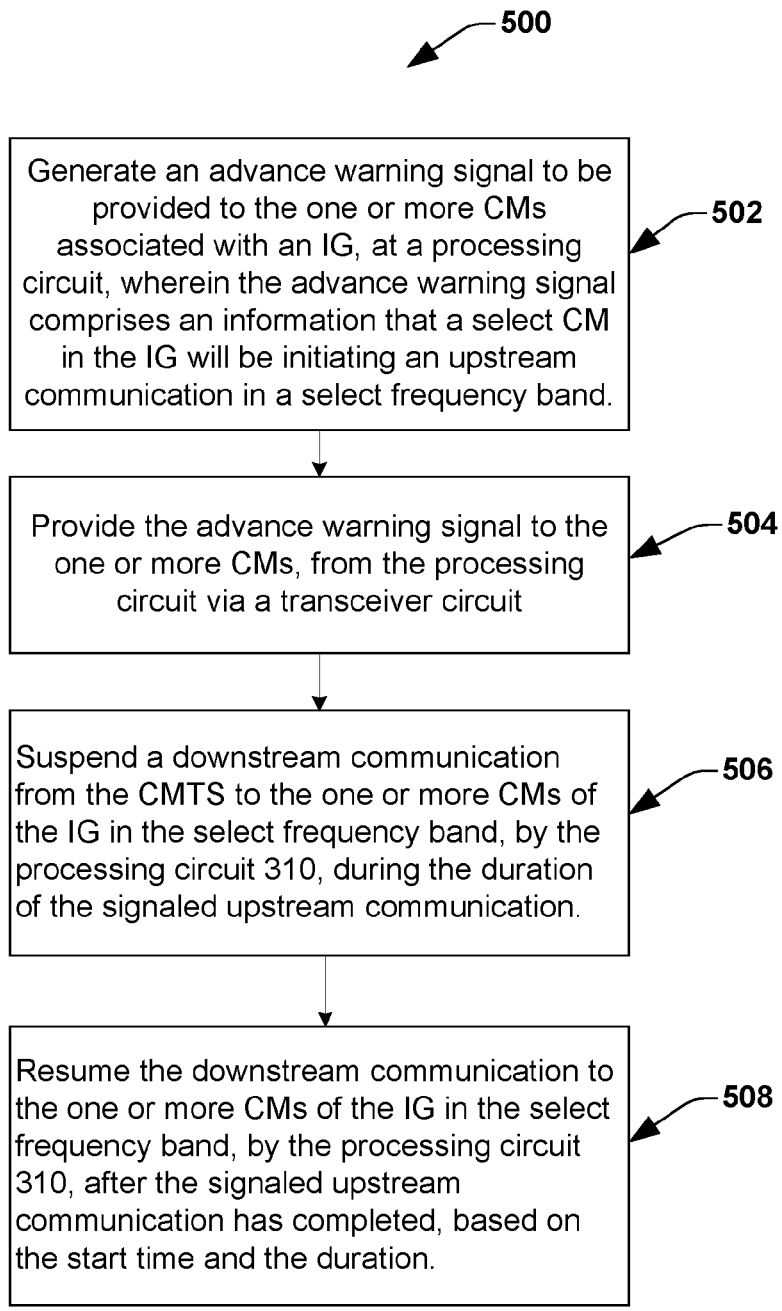
FIG. 5 illustrates a flow chart of a method for a head-end equipment in a communication system, according to one embodiment of the disclosure.

FIG. 5 illustrates a flow chart of a method 500 for a head-end equipment in a communication system, according to one embodiment of the disclosure. The method 500 is explained herein with reference to the apparatus 300 in FIG. 3. In some embodiments, the apparatus 300 could be included within the head-end equipment 102 in FIG. 1a or the CMTS 152 in FIG. 1b or the CMTS 202 in FIG. 2. In this embodiment, the method 500 is further explained with reference to the CMS 202 in the cable modem communication network 200 in FIG. 2). At 502, an advance warning signal (e.g., the advance warning signal 210 in FIG. 2) is generated at the processing circuit 310 to be provided to the one or more CMs (e.g., the CM0 204a in FIG. 2) associated with an IG (e.g., the IG 206 in FIG. 2). In some embodiments, the advance warning signal comprises an information that a select CM (e.g., the CM1 204b in FIG. 2) in the IG will be initiating an upstream communication in a select frequency band. In some embodiments, the advance warning signal further comprises information on the start time and the duration of the upstream communication.

In some embodiments, the advance warning signal is generated at the processing circuit 310, in response to determining information on the upcoming upstream communication from the select CM at the processing circuit 310, or in response to receiving an upstream communication request signal (e.g., the upstream communication request signal 208 in FIG. 2) from the select CM at the processing circuit 310. In some embodiments, the upstream communication request signal comprises a request to allocate resources to the select CM, to enable the select CM to transmit the upstream data. At 504, the advance warning signal is provided by the processing circuit 310 to the one or more CMs, via the transceiver circuit 320. In some embodiments, the advance warning signal is provided to the one or more CMs, from the processing circuit 310, prior to the start time of the upstream communication.

In some embodiments, the advance warning signal is generated at the processing circuit 310 based on inserting the information associated with the advance warning signal into physical layer OFDM symbol headers. In some embodiments, the advance warning signal is provided from the processing circuit 310 to the one or more CMs over a Physical Layer Channel (PLC). Alternately, in other embodiments, the advance warning signal is provided from the processing circuit 310 to the one or more CMs via media access control (MAC) messaging. At 506, a downstream communication from the CMTS to the one or more CMs of the IG in the select frequency band is suspended by the processing circuit 310, during the duration of the signaled upstream communication. At 508, the downstream communication to the one or more CMs of the IG is scheduled by the processing circuit 310, in a frequency band, different from the select frequency band, during the duration of the signaled upstream communication. At 510, the downstream communication to the one or more CMs of the IG in the select frequency band is resumed by the processing circuit 310, after the signaled upstream communication has completed, based on the start time and the duration.

Figure 6:
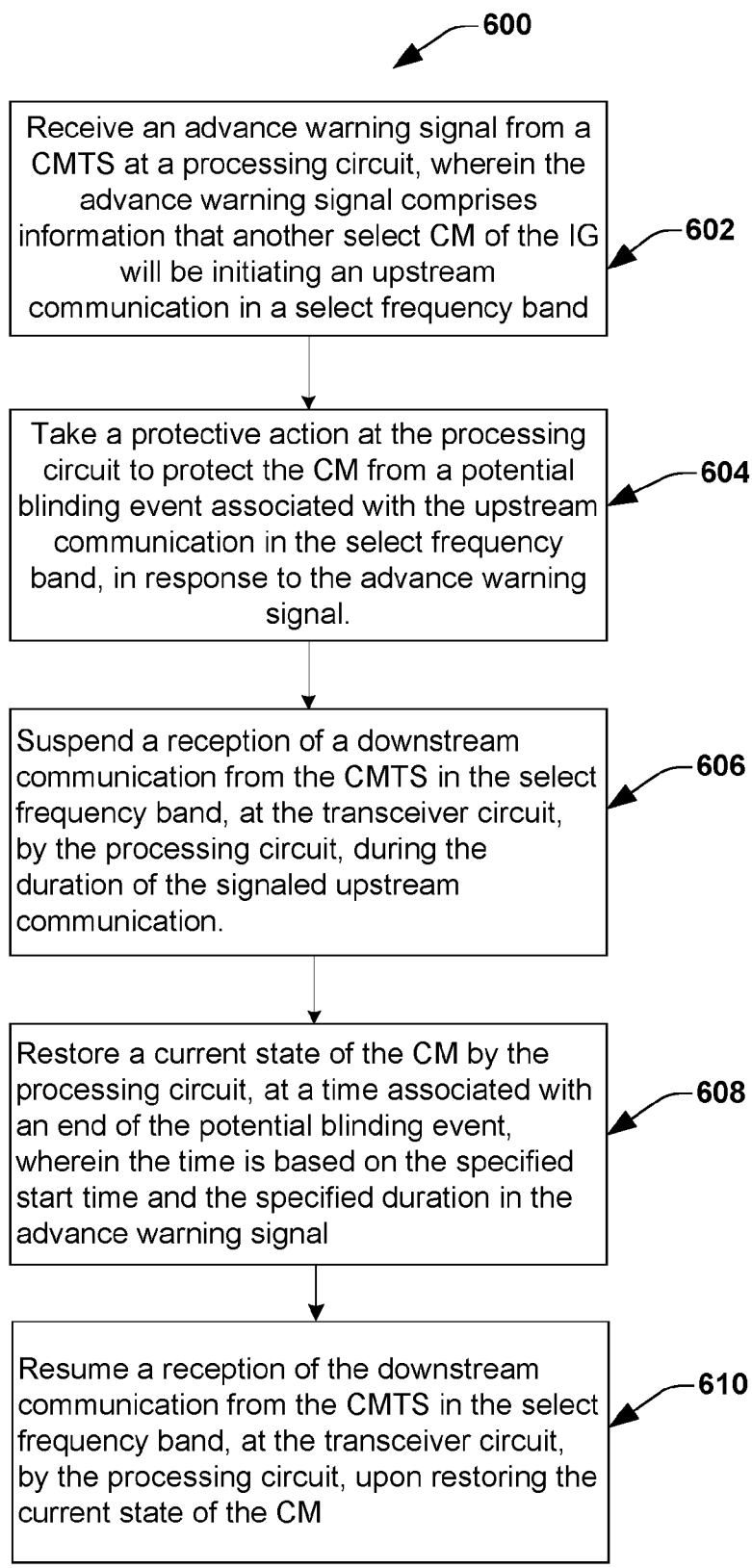
FIG. 6 illustrates a flow chart of a method 600 for a modem in a communication system, according to one embodiment of the disclosure.

FIG. 6 illustrates a flow chart of a method 600 for a modem in a communication system, according to one embodiment of the disclosure. The method 600 is explained herein with reference to the apparatus 400 in FIG. 4. In some embodiments, the apparatus 400 could be included within the CM0 204a in FIG. 2 and is therefore explained herein with reference to the cable modem CM0 204a. However, in other embodiments, method 600 can be explained with reference to any modem, for example, modems 104a-104i in the communication system 100 in FIG. 1a. At 602, an advance warning signal (e.g., the advance warning signal 210 in FIG. 2) is received at the processing circuit 410, from a CMTS (e.g., the CMTS 202 in FIG. 2) via the transceiver circuit 420. In some embodiments, the advance warning signal comprises an information that a select CM (e.g., the CM1 204b in FIG. 2) in an IG (e.g., IG 206 in FIG. 2) associated therewith will be initiating an upstream communication in a select frequency band. In some embodiments, the advance warning signal further comprises information on a start time and a duration of the upstream communication.

At 604, a protective action is taken at the processing circuit 410 to protect the CM (e.g., the CM0 204a in FIG. 2) from a potential blinding event associated with the upstream communication in the select frequency band, in response to the advance warning signal. In some embodiments, taking the protective action at the processing circuit 410 enables the CM to remain in a lock state with the CMTS, during the upstream communication of the select CM in the select frequency band. In some embodiments, the processing circuit 410 is further configured to start a timer at the specified start time of the signaled upstream communication and configured to count to a count value associated with the specified duration of the signaled upstream communication.

In some embodiments, the processing circuit 410 is configured to take the protective action by saving a current state of the processing circuit 410, or the transceiver circuit 420, or both, in the memory circuit 430. In some embodiments, the current state of the processing circuit 410, or the transceiver circuit 420 is characterized by one or more of a signal level, a signal timing, a frequency offset, and a channel frequency response. However, in other embodiments the current state of the processing circuit 410 or the transceiver circuit 420 can be characterized differently than above. At 606, a reception of a downstream communication from the CMTS in the select frequency band, at the transceiver circuit 420, is suspended by the processing circuit 410 during the duration of the signaled upstream communication.

At 608, the current state of the processing circuit 410, or the transceiver circuit 420 or both is restored by the processing circuit 410, at a time associated with an end of the potential blinding event, wherein the time is based on the specified start time and the specified duration in the advance warning signal. In some embodiments, the processing circuit 410 is configured to retrieve one or more stored parameters associated with the current state of the processing circuit 410, or the transceiver circuit 420, or both, from the memory circuit 430, in order to restore the current state of the processing circuit 410, or the transceiver circuit 420, or both. At 610, a reception of the downstream communication from the CMTS in the select frequency band at the transceiver circuit 420 is resumed by the processing circuit 410, upon the restoring of the current state of the processing circuit 410, or the transceiver circuit 420, or both.

While the methods are illustrated, and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Figure 7:
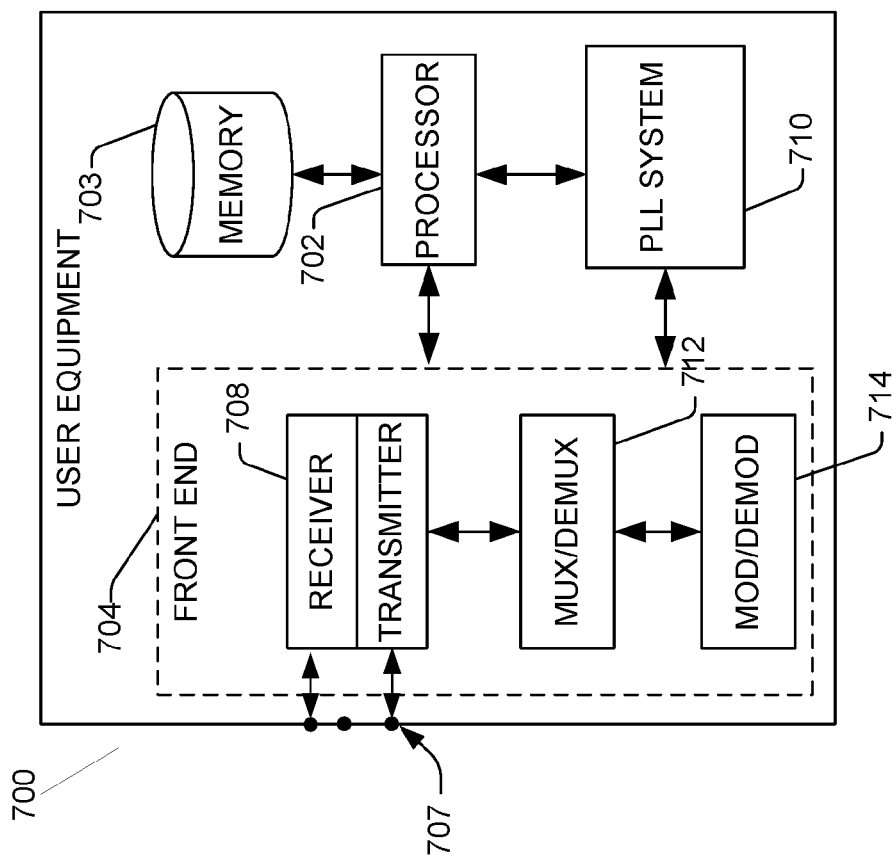
FIG. 7 illustrates a block diagram of an embodiment of device (e.g., cable modem or gateway, etc.) related to access of a network, according to the various embodiments described herein.

To provide further context for various aspects of the disclosed subject matter, FIG. 7 illustrates a block diagram of an embodiment of device 700 (e.g., a modem, a cable modem or gateway, etc.) related to access of a network (e.g., base station, wireless access point, femtocell access point, and so forth) that can enable and/or exploit features or aspects of the disclosed aspects.

The device 700 can be utilized with one or more aspects (e.g., the head-end equipment 102 in FIG. 1a, the CMTS 152 in FIG. 1b, the modems 104a-104i in FIG. 1a, the CM0 204a in FIG. 2, the CM1 204b in FIG. 2 etc.) of communication networks described herein according to various aspects. The user device 700, for example, comprises a digital baseband processor 702 that can be coupled to a data store or memory 703 and a front end 704 (e.g., an RF front end, an acoustic front end, an optical front end, or the other like front end). The device 700 further comprises one or more input/output ports 707 configured to receive and transmit signals to and from one or more devices such as access points, access terminals, wireless ports, routers and so forth, which can operate within a radio access network or other communication network generated via a network device (not shown).

The device 700 can be a radio frequency (RF) device for communicating RF signals, an acoustic device for communicating acoustic signals, an optical device for communicating optical signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 704 can include a communication platform, which comprises electronic components and associated circuitry that provide for processing, manipulation or shaping of the received or transmitted signals via one or more receivers or transmitters (e.g. transceivers) 708, a mux/demux component 712, and a mod/demod component 714. The front end 704 is coupled to the digital baseband processor 702 and the set of input/output ports 707. The front end 704 may be configured to perform the remodulation techniques described herein to extend the frequency range of the device 700. In one aspect, the user equipment device 700 can comprise a phase locked loop system 710.

The processor 702 can confer functionality, at least in part, to substantially any electronic component within the mobile communication device 700, in accordance with aspects of the disclosure. As an example, the processor 702 can be configured to execute, at least in part, executable instructions that cause the front end to remodulate signals to selected frequencies. The processor 702 is functionally and/or communicatively coupled (e.g., through a memory bus) to memory 703 in order to store or retrieve information necessary to operate and confer functionality, at least in part, to communication platform or front end 704, the phase locked loop system 710 and substantially any other operational aspects of the phase locked loop system 710. The phase locked loop system 710 includes at least one oscillator (e.g., a VCO, DCO or the like) that can be calibrated via core voltage, a coarse tuning value, signal, word or selection process.

The processor 702 can operate to enable the mobile communication device 700 to process data (e.g., symbols, bits, or chips) for multiplexing/demultiplexing with the mux/demux component 712, or modulation/demodulation via the mod/demod component 714, such as implementing direct and inverse fast Fourier transforms, selection of modulation rates, selection of data packet formats, inter-packet times, etc. Memory 703 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a head-end equipment associated with a communication system configured to interface with an interference group (IG) composed of two or more modems, the head-end equipment comprising: a memory configured to store a plurality of instructions; and one or more processors configured to retrieve the plurality of instructions from the memory, and upon execution of the plurality of instructions is configured to determine an upcoming upstream transmission from a select modem in the IG in a select frequency band; generate an advanced warning signal to be provided to one or more modems, different from the select modem, in the IG or suspend a downstream communication from the head-end equipment to the one or more modems of the IG in the select frequency band during a duration of the upstream communication, or both; wherein the advanced warning signal communicates an information that the select modem in the IG will be initiating the upstream communication in the select frequency band, as well as information on a start time and the duration of the upstream communication.

Example 2 is a head-end equipment, including the subject matter of example 1, wherein the one or more processors is further configured to resume the downstream communication to the one or more modems of the IG in the select frequency band, after the upstream communication has completed.

Example 3 is a head-end equipment, including the subject matter of examples 1-2, including or omitting elements, wherein the one or more processors is further configured to schedule the downstream communication to the one or more modems of the IG, in a frequency band, different from the select frequency band, during the duration of the upstream communication.

Example 4 is a head-end equipment, including the subject matter of examples 1-3, including or omitting elements, wherein the one or more processors is configured to generate the advance warning signal based on inserting the information associated with the advance warning signal into physical layer OFDM symbol headers.

Example 5 is a head-end equipment, including the subject matter of examples 1-4, including or omitting elements, wherein the one or more processors is configured to provide the advance warning signal to the one or more modems, over a Physical Layer channel (PLC).

Example 6 is a head-end equipment, including the subject matter of examples 1-5, including or omitting elements, wherein the one or more processors is configured to provide the advance warning signal to the one or more modems, via media access control (MAC) messaging.

Example 7 is a head-end equipment, including the subject matter of examples 1-6, including or omitting elements, wherein the head-end equipment comprises a cable modem termination system (CMTS) and the modems comprise cable modems (CMs).

Example 8 is a modem associated with a communication system configured to interface with a head-end equipment in a full duplex mode (FDX), wherein the modem is a member of an interference group (IG) of a plurality of modems, comprising a memory configured to store a plurality of instructions; and one or more processors configured to retrieve the plurality of instructions from the memory, and upon execution of the plurality of instructions is configured to receive an advance warning signal from the head-end equipment, wherein the advance warning signal comprises information that another select modem of the IG will be initiating an upstream communication in a select frequency band, as well as information on a start time and a duration of the signaled upstream communication; and take a protective action to protect the modem from a potential blinding event associated with the upstream communication in the select frequency band, in response to the advance warning signal, thereby enabling the modem to remain in a lock state with the head-end equipment, during the upstream communication in the select frequency band.

Example 9 is a modem, including the subject matter of example 8, wherein the one or more processors is configured to take the protective action by saving a current state of the one or more processors, or a transceiver circuitry associated with the modem or both, in the memory associated therewith.

Example 10 is a modem, including the subject matter of examples 8-9, including or omitting elements, wherein the current state of the one or more processors, or the transceiver circuitry is characterized by one or more of a signal level, a signal timing, a frequency offset, and a channel frequency response.

Example 11 is a modem, including the subject matter of examples 8-10, including or omitting elements, wherein the one or more processors is further configured to restore the current state of the one or more processors, or the transceiver circuitry, or both, at a time associated with an end of the potential blinding event, wherein the time is based on the specified start time and the specified duration in the advance warning signal.

Example 12 is a modem, including the subject matter of examples 8-11, including or omitting elements, wherein the one or more processors is further configured to signal the transceiver circuitry to suspend a receipt of a downstream communication from the head-end equipment at the modem, in the select frequency band, during the duration of the signaled upstream communication.

Example 13 is a modem, including the subject matter of examples 8-12, including or omitting elements, wherein the one or more processors is further configured to signal the transceiver circuitry to resume the receipt of the downstream communication from the head-end equipment at the modem, in the select frequency band, upon the restoring of the current state of the one or more processors, or the transceiver circuitry or both.

Example 14 is a modem, including the subject matter of examples 8-13, including or omitting elements, wherein the one or more processors is further configured to generate one or more control signals to be provided to the transceiver circuitry, in order to receive information on the current state of the transceiver circuitry, or to signal the transceiver circuitry to suspend a receipt of a downstream communication from the head-end equipment, or both.

Example 15 is a modem, including the subject matter of examples 8-14, including or omitting elements, wherein the one or more processors is further configured to generate one or more restoration signals to be provided to the transceiver circuitry, in order to enable the transceiver circuitry to restore the current state and signal the transceiver circuitry to resume the receipt of the downstream communication from the head-end equipment in the select frequency band.

Example 16 is a modem, including the subject matter of examples 8-15, including or omitting elements, wherein the one or more processors is configured to take the protective action by starting a timer that is configured to count to a count value associated with the specified duration.

Example 17 is a modem, including the subject matter of examples 8-15, including or omitting elements, wherein the head-end equipment comprises a cable modem termination system (CMTS) and the modems comprise cable modems (CMs).

Example 18 is a head-end equipment associated with a communication system configured to interface with an interference group (IG) composed of two or more modems, the head-end equipment comprising a memory configured to store a plurality of instructions; and one or more processors configured to retrieve the plurality of instructions from the memory, and upon execution of the plurality of instructions is configured to generate an advanced warning signal to be provided to one or more UEs associated with the IG; wherein the advanced warning signal communicates an information that a select modem, different from the one or more modems, in the IG will be initiating an upstream communication in a select frequency band, as well as information on a start time and a duration of the upstream communication.

Example 19 is a head-end equipment, including the subject matter of example 18, wherein the one or more processors is further configured to suspend a downstream communication from the head-end equipment to the one or more modems of the IG in the select frequency band, during the duration of the signaled upstream communication.

Example 20 is a head-end equipment, including the subject matter of examples 18-19, including or omitting elements, wherein the one or more processors is further configured to resume the downstream communication to the one or more modems of the IG in the select frequency band, after the signaled upstream communication has completed, based on the start time and the duration.

Example 21 is a head-end equipment, including the subject matter of examples 18-20, including or omitting elements, wherein the one or more processors is further configured to schedule the downstream communication to the one or more modems of the IG, in a frequency band, different from the select frequency band, during the duration of the signaled upstream communication.

Example 22 is a head-end equipment, including the subject matter of examples 18-21, including or omitting elements, wherein the one or more processors is configured to generate the advance warning signal based on inserting the information associated with the advance warning signal into physical layer OFDM symbol headers.

Example 23 is a head-end equipment, including the subject matter of examples 18-22, including or omitting elements, wherein the one or more processors is configured to provide the advance warning signal to the one or more modems, over a Physical Layer channel (PLC).

Example 24 is a head-end equipment, including the subject matter of examples 18-23, including or omitting elements, wherein the one or more processors is configured to provide the advance warning signal to the one or more modems, via media access control (MAC) messaging.

Example 25 is a head-end equipment, including the subject matter of examples 18-24, including or omitting elements, wherein the head-end equipment comprises a cable modem termination system (CMTS) and the modems comprise cable modems (CMs).

Example 26 is a cable modem (CM) configured to interface with a cable modem termination system (CMTS) in a full duplex mode (FDX), wherein the cable modem is a member of an interference group (IG) of a plurality of CMs, comprising a memory configured to store a plurality of instructions; and one or more processors configured to retrieve the plurality of instructions from the memory, and upon execution of the plurality of instructions is configured to receive an advance warning signal from the CMTS, wherein the advance warning signal comprises information that another select CM of the IG will be initiating an upstream communication in a select frequency band, as well as information on a start time and a duration of the signaled upstream communication; and take a protective action to protect the CM from a potential blinding event associated with the upstream communication in the select frequency band, in response to the advance warning signal, thereby enabling the CM to remain in a lock state with the CMTS, during the upstream communication in the select frequency band.

Example 27 is a CM, including the subject matter of example 26, wherein the one or more processors is configured to take the protective action by saving a current state of the one or more processors, or a transceiver circuitry associated with the CM or both, in the memory associated therewith.

Example 28 is a CM, including the subject matter of examples 26-27, including or omitting elements, wherein the current state of the one or more processors, or the transceiver circuitry is characterized by one or more of a signal level, a signal timing, a frequency offset, and a channel frequency response.

Example 29 is a CM, including the subject matter of examples 26-28, including or omitting elements, wherein the one or more processors is further configured to restore the current state of the one or more processors, or the transceiver circuitry, or both, at a time associated with an end of the potential blinding event, wherein the time is based on the specified start time and the specified duration in the advance warning signal.

Example 30 is a CM, including the subject matter of examples 26-29, including or omitting elements, wherein the one or more processors is further configured to signal the transceiver circuitry to suspend a receipt of a downstream communication from the CMTS at the CM, in the select frequency band, during the duration of the signaled upstream communication.

Example 31 is a CM, including the subject matter of examples 26-30, including or omitting elements, wherein the one or more processors is further configured to signal the transceiver circuitry to resume the receipt of the downstream communication from the CMTS at the CM, in the select frequency band, upon the restoring of the current state of the one or more processors, or the transceiver circuitry or both.

Example 32 is a CM, including the subject matter of examples 26-31, including or omitting elements, wherein the one or more processors is further configured to generate one or more control signals to be provided to the transceiver circuitry, in order to receive information on the current state of the transceiver circuitry, or to signal the transceiver circuitry to suspend a receipt of a downstream communication from the CMTS, or both.

Example 33 is a CM, including the subject matter of examples 26-32, including or omitting elements, wherein the one or more processors is further configured to generate one or more restoration signals to be provided to the transceiver circuitry, in order to enable the transceiver circuitry to restore the current state and signal the transceiver circuitry to resume the receipt of the downstream communication from the CMTS in the select frequency band.

Example 34 is a CM, including the subject matter of examples 26-33, including or omitting elements, wherein the one or more processors is configured to take the protective action by starting a timer that is configured to count to a count value associated with the specified duration.

Example 35 is a method for a cable modem termination system (CMTS) configured to interface with an interference group (IG) composed of two or more cable modems (CMs), comprising: generating, at a processing circuit associated with the CMTS, an advanced warning signal to be provided to one or more cable modems (CMs) associated with the IG; wherein the advanced warning signal communicates an information that a select CM, different from the one or more CMs, in the IG will be initiating an upstream communication in a select frequency band, as well as information on a start time and a duration of the upstream communication.

Example 36 is a method, including the subject matter of example 35, including or omitting elements, further comprising suspending, by the processing circuit, a downstream communication from the CMTS to the one or more CMs of the IG in the select frequency band, during the duration of the signaled upstream communication.

Example 37 is a method, including the subject matter of examples 35-36, including or omitting elements, further comprising resuming, by the processing circuit, the downstream communication to the one or more CMs of the IG in the select frequency band, after the signaled upstream communication has completed, based on the start time and the duration of the upstream communication.

Example 38 is a method, including the subject matter of examples 35-37, including or omitting elements, further comprising scheduling, by the processing circuit, the downstream communication to the one or more CMs of the IG, in a frequency band, different from the select frequency band, during the duration of the signaled upstream communication.

Example 39 is a method for a cable modem (CM) configured to interface with a cable modem termination system (CMTS) in a full duplex mode (FDX), wherein the cable modem is a member of an interference group (IG) of a plurality of CMs, comprising receiving, at a processing circuit associated with the CM, an advance warning signal from the CMTS, wherein the advance warning signal comprises information that another select CM of the IG will be initiating an upstream communication in a select frequency band, as well as information on a start time and a duration of the signaled upstream communication; and taking a protective action to protect the CM from a potential blinding event associated with the upstream communication in the select frequency band, by the processing circuit, in response to the advance warning signal, thereby enabling the CM to remain in a lock state with the CMTS, during the upstream communication in the select frequency band.

Example 40 is a method, including the subject matter of example 39, wherein taking the protective action comprises saving, by the processing circuit, a current state of the processing circuit, or a transceiver circuitry associated with the CM or both, in a memory associated therewith.

Example 41 is a method, including the subject matter of examples 39-40, including or omitting elements, further comprising restoring, by the processing circuit, the current state of the processing circuit, or the transceiver circuitry, or both, at a time associated with an end of the potential blinding event, wherein the time is based on the specified start time and the specified duration in the advance warning signal.

Example 42 is a method, including the subject matter of examples 39-41, including or omitting elements, further comprising suspending, by the processing circuit, a receipt of a downstream communication from the CMTS at the CM, in the select frequency band, during the duration of the signaled upstream communication.

Example 43 is a method, including the subject matter of examples 39-42, including or omitting elements, further comprising resuming, by the processing circuit, the receipt of the downstream communication from the CMTS at the CM, in the select frequency band, upon the restoring of the current state of the processing circuit, or the transceiver circuitry or both.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A method implemented in a cable modem termination system (CMTS) apparatus comprising:
   coordinating cable broadband signals for full duplex communication;
   determining an interference group (IG) of one or more cable modems (CMs) based on an interference of communication of another CM on at least one CM in the IG; and
   generating a message signal to indicate to one or more CMs in the IG about an upcoming upstream communication from another CM in the IG in a select frequency band.

2. The method of claim 1, further comprising:
   coordinating traffic granting a communication direction, including freezing the direction, of the one or more CMs to avoid interference.

3. The method of claim 1, wherein the message signal includes information including at least one of a start time, duration, or frequency band of the upcoming upstream communication.

4. The method of claim 1, wherein the IG is determined based on a sub-band of the one or more CMs.

5. The method of claim 1, wherein the one or more CMs of the IG have interference of upstream signals with downstream reception of said another CM.

6. A non-transitory machine-readable media including machine executable instructions that when executed cause one or more processors to perform a method of claim 1.

7. A method implemented in a cable modem (CM) apparatus, comprising:
   communicating cable broadband signals for full duplex communication with a cable modem termination system (CMTS); and
   receiving a message signal from the CMTS indicating an upcoming upstream communication from another CM in an interference group (IG) in a select frequency band.

8. The method of claim 7, wherein the message signal includes information including at least one of a start time, duration, or frequency band of the upcoming upstream communication.

9. The method of claim 7, wherein the IG is determined based on a sub-band of the one or more CMs.

10. The method of claim 7, wherein the one or more CMs of the IG have interference of upstream signals with downstream reception of said another CM.

11. A non-transitory machine-readable media including machine executable instructions that when executed cause one or more processors to perform a method of claim 7.

\* \* \* \* \*